(12) United States Patent
Shayovitz et al.

(10) Patent No.: US 11,032,167 B2
(45) Date of Patent: Jun. 8, 2021

(54) PRECURSOR REJECTION FILTER

(71) Applicant: Apple Inc., Cupertino, CA (US)

(72) Inventors: Shachar Shayovitz, Ness Ziona (IL); Michael Kerner, Tel Mond (IL); Zohar Agon, Tel Aviv (IL)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/441,679

(22) Filed: Jun. 14, 2019

(65) Prior Publication Data

US 2020/0396145 A1  Dec. 17, 2020

(51) Int. Cl.
  *H04L 12/26*  (2006.01)

(52) U.S. Cl.
  CPC ........ *H04L 43/028* (2013.01); *H04L 43/0888* (2013.01)

(58) Field of Classification Search
  CPC ........................... H04L 43/028; H04L 43/0888
  See application file for complete search history.

(56) References Cited

U.S. PATENT DOCUMENTS

| | | | |
|---|---|---|---|
| 6,192,386 B1 | 2/2001 | Shinde | |
| 6,937,592 B1 * | 8/2005 | Heath, Jr. | ............. H04W 16/14 370/342 |
| 7,188,135 B2 | 3/2007 | Takatori et al. | |
| 8,654,821 B2 | 2/2014 | Safiri | |
| 2007/0239001 A1 * | 10/2007 | Mehi | ................... G01S 7/52017 600/437 |
| 2009/0080581 A1 * | 3/2009 | Schuur | ............... H03H 17/0292 375/350 |
| 2010/0172596 A1 * | 7/2010 | Hier | ...................... G06T 3/4007 382/260 |
| 2010/0177816 A1 * | 7/2010 | Malipatil | .......... H04L 25/03057 375/233 |
| 2013/0243053 A1 * | 9/2013 | Safiri | ................ H04L 25/03853 375/219 |
| 2018/0048345 A1 * | 2/2018 | Pehlke | ..................... H04B 1/40 |

FOREIGN PATENT DOCUMENTS

WO      02076054       9/2002

* cited by examiner

*Primary Examiner* — Jaison Joseph
(74) *Attorney, Agent, or Firm* — Kowert, Hood, Munyon, Rankin & Goetzel, P.C.; Erik A. Heter

(57) ABSTRACT

A precursor rejection filter is disclosed. A digital filter is coupled to receive packets from a data source. The filter may operate in one of a first mode or a second mode. In the first mode, the filter may receive communications packets. When operating in the second mode, the filter may receive sensing packets. Furthermore, when operating in the second mode, the filter may cause a precursor of the equivalent impulse response of the transmitter to be attenuated without attenuating the main lobe of the equivalent impulse response of the transmitter.

20 Claims, 6 Drawing Sheets

PRECURSOR REJECTION FILTER

BACKGROUND

Technical Field

This disclosure is related to communications systems, and more particularly, filters used in communications systems.

Description of the Related Art

In various types of communications system, such as wireless systems, the types of information that can be conveyed varies. For example, in systems that convey information in packets, some packets may be used to convey data (e.g., information to be shared between users of the system), while other information may be used in sensing applications. In the latter case, the sensing application may be used to determine factors such as signal strength, distance between transmitter and receiver, and so forth.

One example of a packet type used for a sensing application is time of flight (ToF) packets. In a wireless system a ToF packet may be periodically transmitted to determine a channel response between a transmitter and a receiver. The channel response may include such factors as distance between transmitter and receiver, signal strength, and/or other relevant metrics.

SUMMARY

A precursor rejection filter is disclosed. In one embodiment, a filter is coupled to receive packets from a data source. The filter may operate in one of a first mode or a second mode. In the first mode, the filter may receive communications packets. When operating in the second mode, the filter may receive sensing packets. Furthermore, when operating in the second mode, the filter may operate to cause a precursor of the equivalent impulse response of transmitter to be attenuated without attenuating the main lobe of the impulse response.

In one embodiment, a filter includes N delay elements, wherein N is an integer value. The filter also includes K multipliers (where K is also an integer value), wherein a first one of the K multipliers is coupled an input to a first one of the N delay elements, and wherein the remaining ones of the K multipliers are coupled to outputs of corresponding ones of the N delay elements, and K multiplexers coupled to provide coefficients to the K multipliers, wherein each of the K multiplexers is coupled to receive one of a first plurality of coefficients on a respective first input and one of a second plurality of coefficients on a respective second input. Control circuitry is arranged to provide selection signals to the K multiplexers to cause respective ones of the first plurality of coefficients to be provided to the K multipliers responsive to the data source conveying communication packets to the filter, and further cause respective ones of the second plurality of coefficients to be provided to the K multipliers responsive to the data source providing a sensing packet to the filter.

BRIEF DESCRIPTION OF THE DRAWINGS

The following detailed description makes reference to the accompanying drawings, which are now briefly described.

Figure 1:
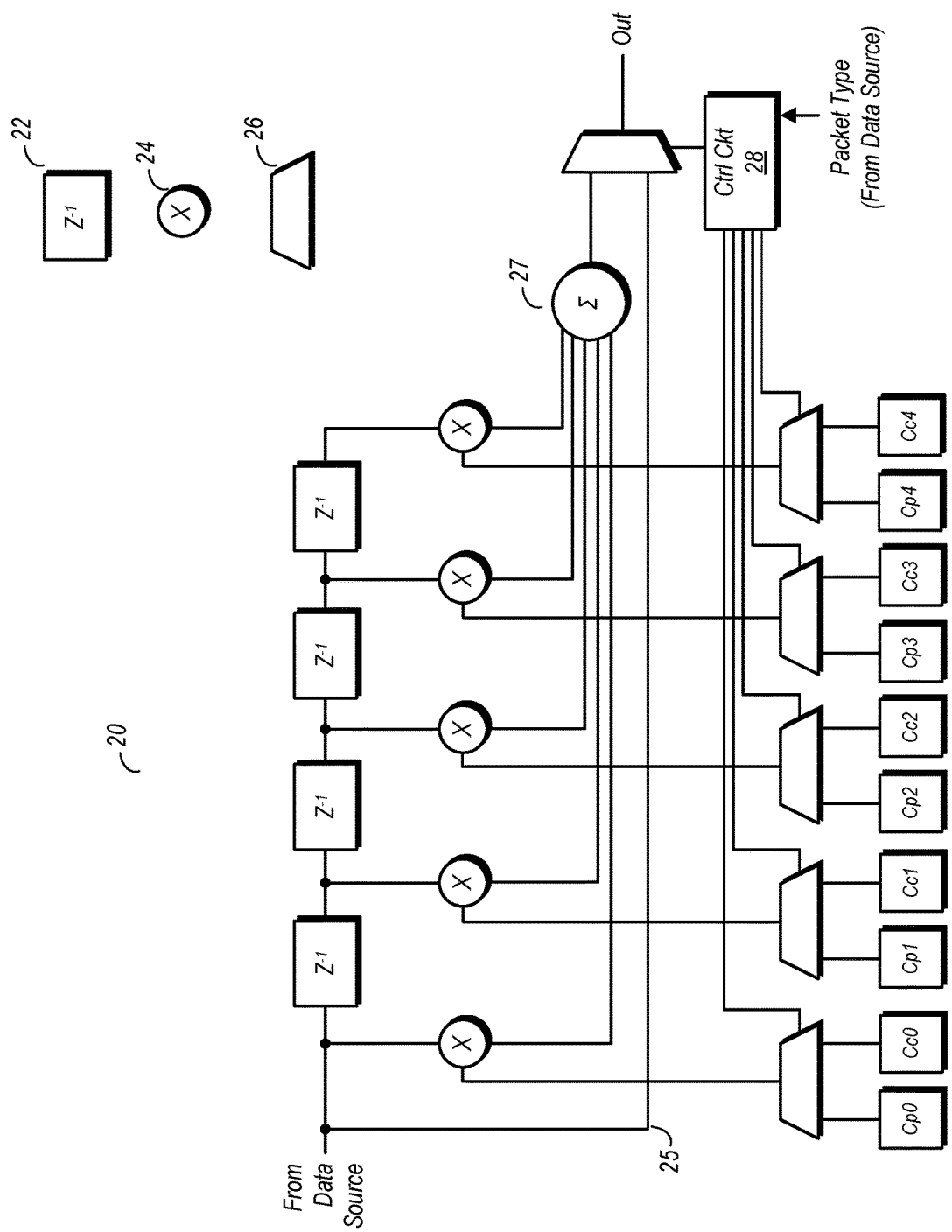
FIG. 1 is a diagram of one embodiment of a filter.

Although the embodiments disclosed herein are susceptible to various modifications and alternative forms, specific embodiments are shown by way of example in the drawings and are described herein in detail. It should be understood, however, that drawings and detailed description thereto are not intended to limit the scope of the claims to the particular forms disclosed. On the contrary, this application is intended to cover all modifications, equivalents and alternatives falling within the spirit and scope of the disclosure of the present application as defined by the appended claims.

This disclosure includes references to "one embodiment," "a particular embodiment," "some embodiments," "various embodiments," or "an embodiment." The appearances of the phrases "in one embodiment," "in a particular embodiment," "in some embodiments," "in various embodiments," or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

In the following description, numerous specific details are set forth to provide a thorough understanding of the disclosed embodiments. One having ordinary skill in the art, however, should recognize that aspects of disclosed embodiments might be practiced without these specific details. In some instances, well-known circuits, structures, signals, computer program instruction, and techniques have not been shown in detail to avoid obscuring the disclosed embodiments.

DETAILED DESCRIPTION OF EMBODIMENTS

The present disclosure is directed to a filter that, in the time domain, causes the attenuation of a precursor of the equivalent impulse repose of a transmitter in a subsequently transmitted analog signal. The remainder of the equivalent impulse response may be left largely intact. Attenuation of the precursor may be particularly useful for certain types of transmissions.

In normal operation, the impact of gain flatness inside an RF (radio frequency) channel may have a small impact on the performance of a modem from which signals are transmitted, including those in which an overall channel response (including analog portions of a transmitter and a receiver, as well as the physical channel itself). However, in some sensing applications, estimating the response of the physical channel becomes critical. For example, in time of flight (ToF), measuring the physical response of the channel comprises measuring the time in which a wireless signal is in the air between an antenna of a transmitter and a receiver. In such applications, attenuation of the precursor may be critical to obtaining an accurate measurement. The filter disclosed herein may make such attenuation possible, and may thus result in more accuracy of sensing applications, such as the aforementioned ToF measurements, and other methods for measuring a distance between a sensor and an object.

FIG. 1 is a diagram of one embodiment of a filter that may be used for attenuating the precursor of a subsequently transmitted analog signal. In the embodiment shown, filter 20 is a digital filter coupled to receive digital input values from, e.g., a baseband unit or other data source. Filter 20 is shown here as having four delay elements 22 and five taps associated with these delay elements. More generally, the filter includes N delay elements 22 and K taps. The taps include one tap at the filter input and additional taps at each of the delay element outputs. The filter also includes five multipliers 24 in this embodiment, and more generally, may include K multipliers (e.g., $K \leq N+1$ in various embodiments). Each of the multiplier outputs is provides to summing circuit 27, which computes a sum of the received values. When the output of summing circuit 27 is selected by the correspondingly coupled multiplexer 26, the digital value of the filter is conveyed therefrom, where it may subsequently be converted into an analog signal.

In this particular embodiment, filter 20 is a finite impulse response (FIR) filter, although embodiments in which filter 20 is implemented as an infinite impulse response (IIR) filter are also possible and contemplated.

As noted above, each of the multipliers 24 is coupled to one of the taps of filter 20. Each of the multipliers is also coupled to receive a coefficient from a correspondingly coupled one of multiplexers 26. The coefficients provided to the multipliers 24 in this embodiment may be associated with either communications packets (e.g., data, etc.) or sensing packets (e.g., ToF packets). Coefficients Cp0-Cp4 may be selected for communications packets, while coefficients Cc0-Cc4 may be selected for sensing packets. Each of the multipliers may compute a product of a present value on its correspondingly coupled tap and the received coefficient, with summing circuit 27 computing the sum of the resulting products.

Filter 20 may act to attenuate the precursor of the equivalent impulse response of a transmitter when the sensing packet coefficients, namely Cc0-Cc4, are applied to the multipliers 24. These coefficients may be computed using a weighted least squares (WLS) method. To counter distortion resulting from the precursor, weighting may be added to the coefficients such that an emphasis is placed on the precursor interval of the corresponding and subsequently produced equivalent impulse response. As used herein, the equivalent impulse response may be defied as the inverse Laplace transform of the transfer function of, e.g., the transmitter chain in which the filter is implemented. The design parameters for various embodiments of filter 20 may include the precursor rejection interval, level of rejection, and desired response of the filter, all of which may be tuned per the response of analog front end circuitry following the filter.

The parameters for designing filter 20 to perform attenuation of the precursor may be the precursor rejection interval, the desired level of rejection, and the desired signal response. These parameters may be fined tuned per the response of analog front end circuitry, which is discussed below. Equation 1 below mathematically specifies the design for one embodiment of a precursor rejection filter:

$$\hat{a} = \mathrm{argmin}_a (\underline{y} - H\underline{a})^\dagger W (\underline{y} - H\underline{a}) \qquad (\text{Eq. 1})$$

where the a term represents the vector of the filter taps, H is the convolution matrix, y is the desired pulse response in time, and W is the weighting matrix. The weighting in this equation places the emphasis on the precursor interval, as the weighted least squares methodology is the core of designs for a small number of filter taps and a high ratio of rejection.

The convolution matrix from Eq. 1 can be derived as follows. A vector variable 'h' can be defined as the time domain impulse response of the analog front end with the dimensions of (Nh×1). Nh may be determined in such a manner to allow an observation of the impulse response decay to the noise floor and to also observe the precursor effect. A variable 'p' is the number of taps in the precursor rejection filter (e.g., p=5, 7, 11, etc.). The convolution matrix H is constructed by taking the first p entries from the vector h and placing them in the first row of matrix H, taking the next p entries from the second entry of vector h and placing them in the second row of matrix H, and repeating this process up to row number Nh with zero padding. This produces a Toeplitz matrix (diagonal constant matrix) H with the dimension of (Nh×p). For example, for h=[h_1 h_2, h_3. . . n_Nh], and p=5, then matrix H is as follows:

$$H = \begin{pmatrix} h_1, h_2, h_3, h_4, h_5 \\ h_2, h_3, h_4, h_5, h_6 \\ \vdots \\ h_{N_h-4}, h_{N_h-3}, h_{N_h-2}, h_{N_h-1}, h_{N_h} \\ \vdots \\ h_{N_h}, 0, 0, 0, 0 \end{pmatrix}. \quad \text{(Eq. 2)}$$

Meanwhile, the matrix W from Eq. 1 is a matrix having the dimensions (Nh×Nh) with all entries as zero except for the diagonal, which is comprised of the vector 'v'. The vector 'v' is a vector of dimensions (Nh×1) which indicates the rejection level and interval of the precursor region. All entries in vector 'v' are 1 except for a region that corresponds to an interval around the precursor in vector h (the impulse response of the analog front end), where the entries are much greater than 1 (e.g., could be 100 dB or more—indicating the weighting of this region for rejection based on the ideal response).

The variable 'y' from Eq. 1 is the desired impulse response vectors, which is a time domain Hanning/Gaussian/Hamming window of (Nh×1), which represents an ideal response with a good precursor behavior and a clear main lobe. The computation of the precursor filters is then done using weighted least squares:

$$\underline{a} = (H^\dagger W H)^{-1} H^\dagger W \underline{y} \quad \text{Eq. 3}$$

wherein (H†WH) is p × p, which means that it should be a relatively small matrix and easy to compute. The term ( )† is the conjugate transpose operator, H†W is p×N_h, while y is N_h×1.Therefore a is p×1—which are the filter coefficients. Note that the process of computing filter taps may be performed on a production line or by using a dedicated closed loop link by measuring the impulse response of the analog front end and performing the algorithm outlined above.

Returning to the description of FIG. 1, control circuit 28 in the embodiment shown is arranged to control the providing of coefficients to the multipliers 24, as well as selecting the filter output. As shown here, control circuit 28 may receive a signal (or signals) indicating the type of the next packet to be transmitted. Depending on the type of the next packet to be transmitted (e.g., communication or sensing), and select the corresponding coefficients to be provided to the various instances of multiplier 24. Filter 20 in the embodiment shown also includes a bypass path 25, which is coupled to one input of the multiplexer 26 from which the filter output is provided. Control circuit 28 may select the bypass path in instances when the filtering is not desired (e.g., for testing purposes).

Figure 2:
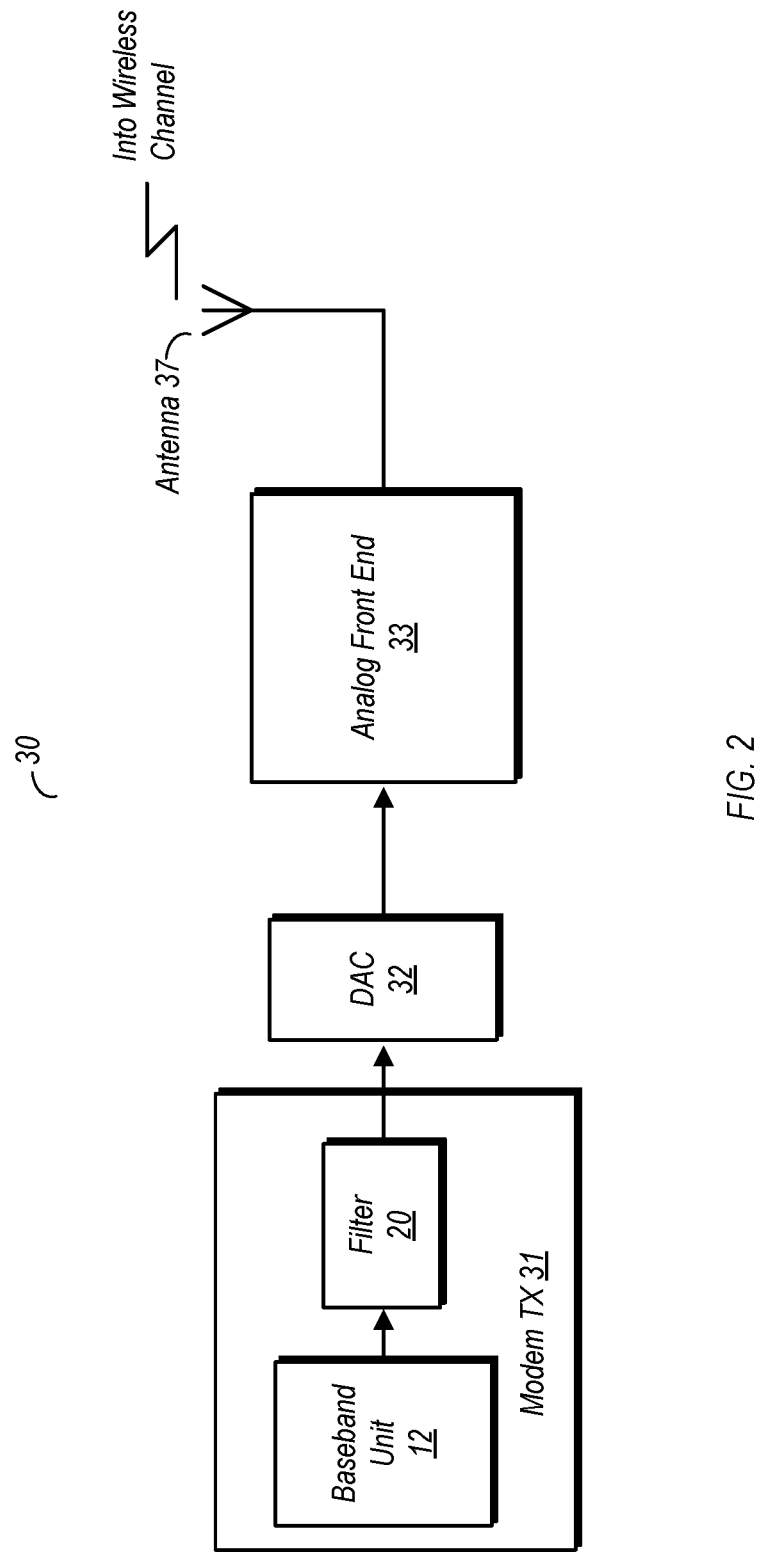
FIG. 2 is a block diagram of one embodiment of a transmitter.

FIG. 2 is a block diagram of one embodiment of a transmitter that may implement an embodiment of filter 20 as discussed herein. Transmitter 30 may be one of any number of different transmitter types, such as a modem conforming to a version of the 802.11 standard, a cellular transmitter, a near field communications (NFC) transmitter, or other type.

Transmit modem 31 in the embodiment shown includes a baseband unit 12 and filter 20. Baseband unit 12 in the embodiment shown may receive information to be transmitted from another source (e.g., a processor in the system in which transmitter 30 is implemented). Among the functions performed by baseband unit may include arranging the received information into packets to be transmitted. The packetized information may then be conveyed to filter 20, which may perform filtering in the digital domain as described above.

The output of filter 20 as shown here may be coupled to a digital-to-analog converter (DAC) 32, which converts the digital information into an analog signal. DAC 32 may be any type of DAC that is suitable for achieving the desired conversion into an analog signal. For certain types of packets (e.g., sensing packets, such as time of flight packets), the analog signal output by DAC 32 may be such that its precursor is significantly attenuated relative to the following main lobe and post cursor of the equivalent impulse response of transmitter. Accordingly, the desired filtering function performed by filter 20 (to suppress a precursor for certain packet types) may be fully realized in the analog domain upon outputting of the analog signal from DAC 32.

The analog signal output from DAC 32 may be provided to analog front end 33, which may perform a number of different analog signal processing functions. For example, analog front end 33 may include one or more mixers to up-convert the frequency of analog signals received from DAC 32 from a baseband frequency to a radio-frequency suitable for wireless transmission. Analog front end 33 may also include amplifiers to boost the signal strength to a desired value for transmission. The final analog signal is then conveyed to antenna 37 and into the wireless channel.

It is noted that the transmitter 30 as shown here is but one example of an application of filter 20 as shown herein. Filter 20 as described above may be used in other applications, and in general, any application in which attenuation of a pre-cursor may be desirable.

Figure 3:
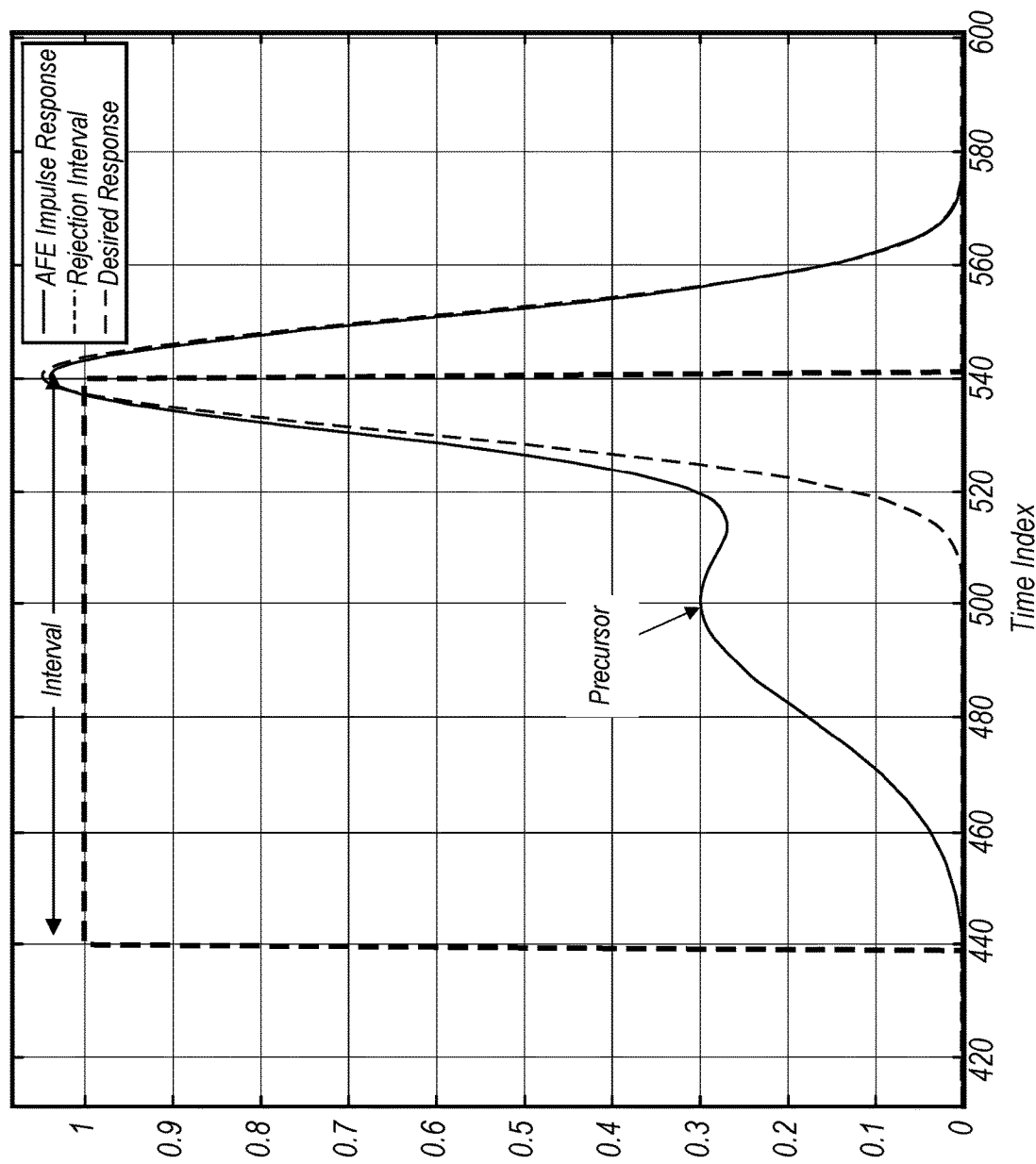
FIG. 3 graphically illustrates operation of one embodiment of a precursor rejection filter in the time domain.

FIG. 3 graphically illustrates operation of one embodiment of a precursor rejection filter in the time domain. More particularly, the graphic illustrations of FIG. 3 illustrate, in the time domain, the rejection intervals and levels desired by one embodiment of the filter as disclosed herein.

A rejection interval over which it is desirable to attenuate the precursor is shown in FIG. 3. Additionally, FIG. 3 illustrates the unfiltered analog front end response (solid curve), and the desired response (dashed curve). A precursor is shown in the analog front end (AFE) impulse response curve, peaking at around 500 on the time index axis. For both the desired and actual AFE impulse response, the signal peaks at approximately 540, which coincides with the end of the rejection interval as shown. As noted above, the coefficients of the filter disclosure herein may be subject to a weighting function intended to put an emphasis on the precursor while allowing the main lobe of the signal to pass largely unattenuated. When present, the precursor may have an adverse effect on some sensing applications, such as the ToF application discussed herein. Conversely, eliminating or largely attenuating the precursor may allow for a more accurate estimation of the channel response in a ToF or other sensing application.

Figure 4:
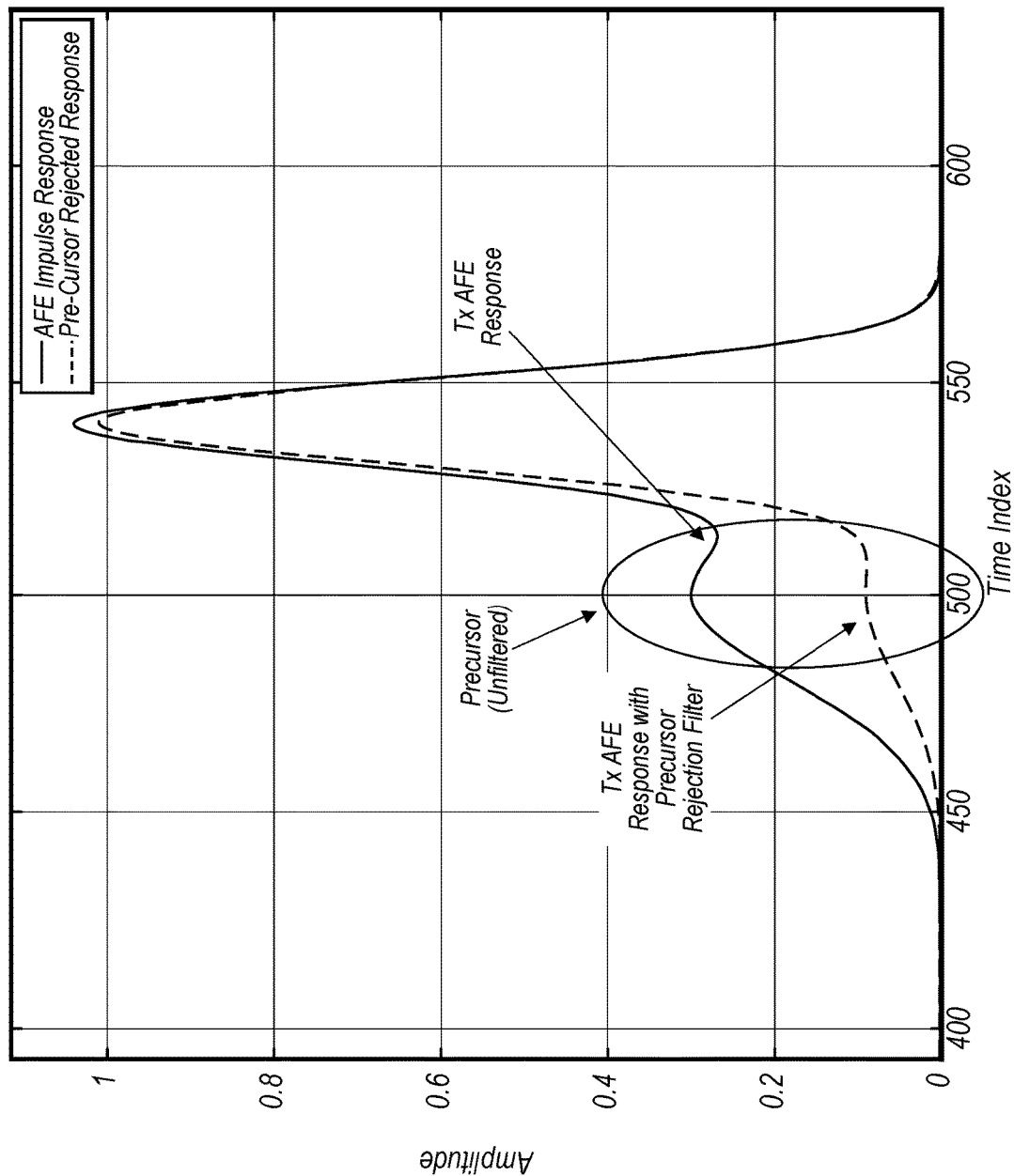
FIG. 4 provides a further graphic illustration of one embodiment of a precursor rejection filter in the time domain.

FIG. 4 provides a further graphic illustration of one embodiment of a precursor rejection filter in the time domain. In this example, the actual effect of filtering to eliminate the precursor is shown. As shown in FIG. 4, at 500 on the time index axis, the analog front end response with the precursor rejection filter results in a significant attenuation of the precursor relative to the unfiltered impulse response. Thus, in applications such as the ToF application discussed above, use of the filter disclosed herein may effectively remove the precursor as a factor while leaving the main lobe of the signal virtually unchanged.

Figure 5:
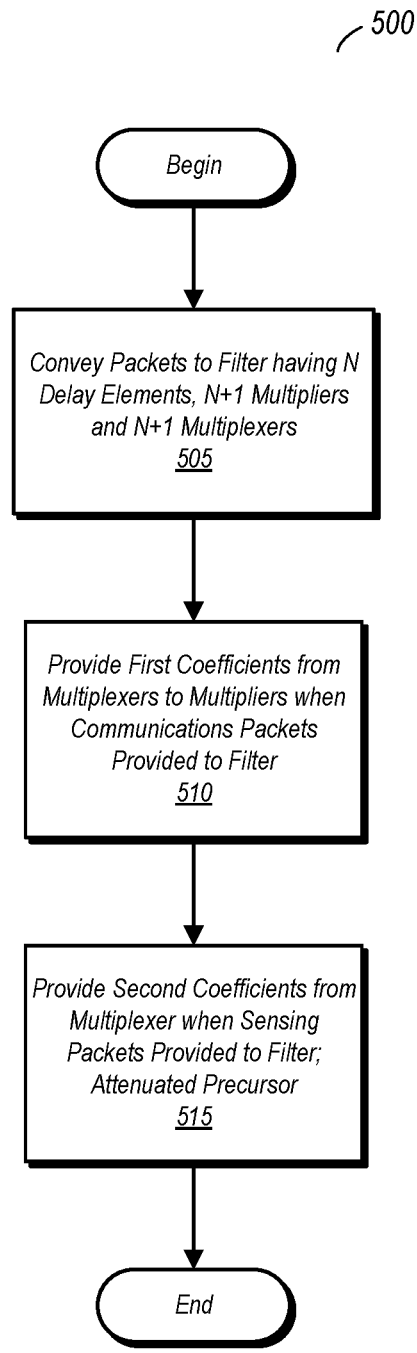
FIG. 5 is a flow diagram illustrating operation of one embodiment of a precursor rejection filter.

FIG. 5 is a flow diagram illustrating operation of one embodiment of a precursor rejection filter. Method 500 as shown herein may be performed in virtually any embodiment of filter 20 discussed above and designed to perform attenuation of a precursor.

Method 500 includes conveying packets to a filter having N delay elements, K multipliers, and K multiplexers (block 505). Using the example of FIG. 1, N=4, while K=5. The method further includes providing coefficients of a first set, from the multiplexers to the multipliers, when communications packets are being provided to the filter (block 510). Referring again to FIG. 1, coefficients Cp0-Cp4 may be applied when communications packets are conveyed. The method further includes providing coefficients of a second set from the multiplexers to the multipliers when sensing packets are provided to the filter, with the filter acting to attenuate the precursor when coefficients of the second set are provided (block 515).

It is noted that the filtering operations described above may be performed for all samples within a packet for a given packet type. Thus, when communications packets are being processed, the corresponding coefficients may be applied during the entirety of the packet. Similarly, for sensing packets, the corresponding coefficients may be applied to all samples in those packets. Switching between one set of coefficients and another may occur between packet transmissions to the filter.

Various embodiment of the method includes the filter attenuating, in a time domain, a precursor of the equivalent impulse response of transmitter when the second set of coefficients is being provided to respective ones of the K multipliers. Accordingly, a main lobe of the equivalent impulse response of transmitter that follows the precursor may be largely unattenuated by the filter when the second set of coefficients is applied. As noted above, the filter may remain active to attenuate samples corresponding to the precursor of the equivalent impulse response of transmitter for the entirety of the packet, with the attenuation of the precursor occurring for a predetermined rejection interval. The sensing packets may include, among others, ToF packets used to determine a time of flight of a wireless signal between a transmitter and a receiver. The filter may include a number of multipliers, the products of which are provided to a summing circuit, with the summing circuit producing a final digital output value for the filter. This digital value may then be conveyed to a DAC for conversion into the analog domain.

Figure 6:
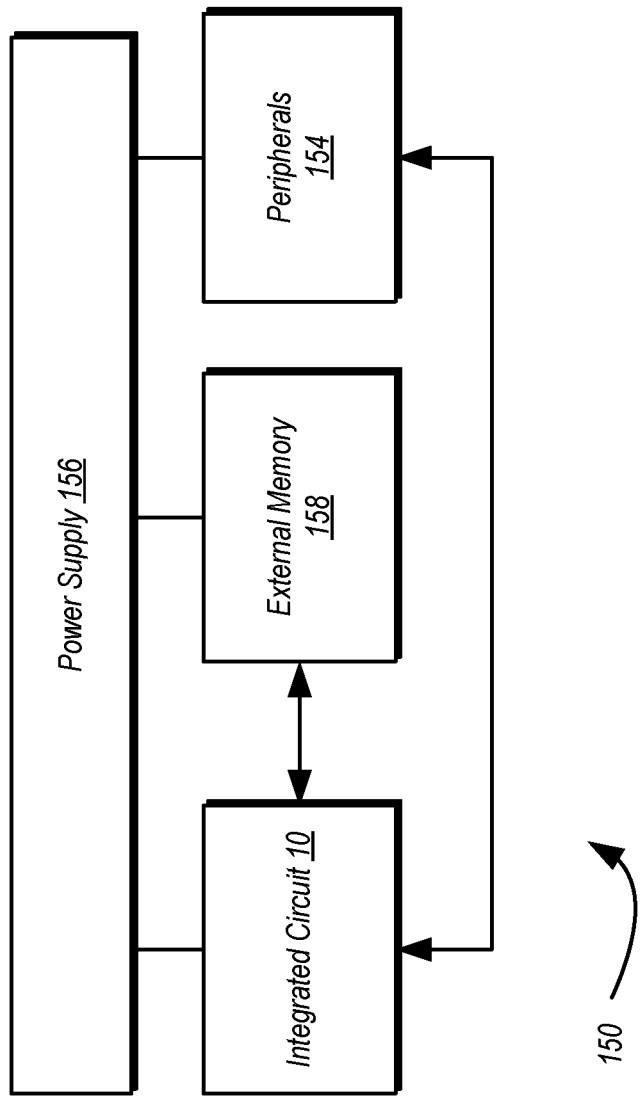
FIG. 6 is a block diagram of one embodiment of an example system.

Turning next to FIG. 6, a block diagram of one embodiment of a system 150 is shown. In the illustrated embodiment, the system 150 includes at least one instance of an integrated circuit 10 coupled to external memory 158. The integrated circuit 10 may include a memory controller that is coupled to the external memory 158. The integrated circuit 10 is coupled to one or more peripherals 154 and the external memory 158. A power supply 156 is also provided which supplies the supply voltages to the integrated circuit 10 as well as one or more supply voltages to the memory 158 and/or the peripherals 154. In some embodiments, more than one instance of the integrated circuit 10 may be included (and more than one external memory 158 may be included as well).

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as WiFi, Bluetooth, cellular, global positioning system, etc. The peripherals 154 may also include additional storage, including RAM storage, solid-state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, tablet, etc.).

The external memory 158 may include any type of memory. For example, the external memory 158 may be SRAM, dynamic RAM (DRAM) such as synchronous DRAM (SDRAM), double data rate (DDR, DDR2, DDR3, LPDDR1, LPDDR2, etc.) SDRAM, RAMBUS DRAM, etc. The external memory 158 may include one or more memory modules to which the memory devices are mounted, such as single inline memory modules (SIMMs), dual inline memory modules (DIMMs), etc.

System 150 in the embodiment shown may include one or more instances of a filter such as that discussed above in reference to FIGS. 1-5. The filter may be implemented in integrated circuit 10 or within peripherals 154. For example, peripherals 154 in one embodiment may include a transmitter which implements a filter in accordance with this disclosure.

Numerous variations and modifications will become apparent to those skilled in the art once the above disclosure is fully appreciated. It is intended that the following claims be interpreted to embrace all such variations and modifications.

What is claimed is:

1. An apparatus comprising:
   a data source configured to convey packets;
   a filter including:
      N delay elements, wherein N is an integer value;
      K multipliers, wherein K is an integer value, and wherein a first one of the K multipliers is coupled an input to a first one of the N delay elements, and wherein the remaining ones of the K multipliers are coupled to outputs of corresponding ones of the N delay elements; and
      K multiplexers coupled to provide coefficients to the K multipliers, wherein ones of the K multiplexers are coupled to receive one of a first plurality of coefficients on a respective first input and one of a second plurality of coefficients on a respective second input; and
   control circuitry configured to provide selection signals to the K multiplexers to cause respective ones of the first plurality of coefficients to be provided to the K multipliers responsive to the data source conveying communication packets to the filter, and further cause respective ones of the second plurality of coefficients to be provided to the K multipliers responsive to the data source providing a sensing packet to the filter, wherein ones of the second plurality of coefficients are determined based on a response of an analog front end circuit coupled to the filter.

2. The apparatus as recited in claim 1, wherein the sensing packets are time of flight (ToF) packets.

3. The apparatus as recited in claim 1, wherein the filter is configured to, in a time domain, attenuate a precursor of an equivalent impulse response of transmitter when a signal to be transmitted responsive to the second plurality of coefficients being provided to the K multipliers.

4. The apparatus as recited in claim 3, wherein the filter is configured to allow a main lobe of the equivalent impulse response of transmitter to be un-attenuated.

5. The apparatus as recited in claim 1, wherein the filter is configured to remain active during an entirety of the sensing packet, and further configured to cause attenuation of an equivalent impulse response of transmitter during the sensing packet for a predetermined rejection interval.

6. The apparatus as recited in claim 1 further comprising a summing circuit coupled to respective outputs of the K multipliers, wherein the summing circuit is configured to generate a sum of values provided from the N delay elements and the input to the first one of the N delay elements.

7. The apparatus as recited in claim 6, further comprising an output multiplexer, wherein the output multiplexer includes a first input coupled to receive the sum of values from the summing circuit and a second input coupled to a bypass path, the bypass path being coupled to an input of the filter.

8. The apparatus as recited in claim 1, further comprising a digital-to-analog converter (DAC) coupled to receive an output value from the filter and configured to convert the output value into an analog signal.

9. The apparatus as recited in claim 8, wherein the analog front end circuit coupled to receive the analog signal from the DAC and configured to transmit the analog signal on a wireless channel.

10. A method comprising:
conveying, from a data source, packets to a filter, the filter including:
N delay elements, wherein N is an integer value;
K multipliers, where K is an integer values, and wherein a first one of the K multipliers is coupled an input to a first one of the N delay elements, and wherein the remaining ones of the K multipliers are coupled to outputs of corresponding ones of the N delay elements; and
K multiplexers coupled to provide coefficients to the K multipliers, wherein ones of the K multiplexers are coupled to receive one of a first plurality of coefficients on a respective first input and one of a second plurality of coefficients on a respective second input;
providing the first plurality of coefficients from the K multiplexers to respectively coupled ones of the K multipliers responsive to the data source conveying packets of a first type to the filter; and
providing the second plurality of coefficients from the K multiplexers to respectively coupled ones of the K multipliers responsive to the data source conveying packets of a second type to the filter, wherein ones of the second plurality of coefficients are determined based on a response of an analog front end circuit coupled to the filter.

11. The method as recited in claim 10, further comprising the filter attenuating, in a time domain, a precursor of an equivalent impulse response of transmitter when the second plurality of coefficients is provided to respective ones of the K multipliers.

12. The method as recited in claim 11, further comprising the filter allowing a main lobe of the equivalent impulse response of transmitter to be un-attenuated.

13. The method as recited in claim 11, wherein the filter is configured to remain active during an entirety of ones of packets of the second type, and further configured to attenuate the equivalent impulse response of transmitter during a predetermined rejection interval.

14. The method as recited in claim 11 wherein the packets of the second type are time of flight (ToF) packets used to determine a time of flight of a wireless signal between a transmitter and a receiver.

15. The method as recited in claim 11, further comprising the filter producing a digital output value, wherein producing the digital output value comprises summing outputs of of the K multipliers.

16. A system comprising:
analog transmitter circuitry configured to wirelessly transmit a wireless signal, wherein the wireless signal is based on an received analog signal;
a digital-to-analog converter (DAC) coupled to provide an analog signal to the analog transmitter circuitry, wherein the DAC is configured to convert a digital value into the analog signal; and
a filter coupled to receive packets from a data source, wherein the filter is configured to operate in a first mode when communications packets are received from the data source, wherein operating in a first mode comprises providing a first plurality of coefficients to the filter, and configured to operate in a second mode when sensing packets are received from the data source, wherein operating in the second mode comprises providing a second plurality of coefficients to the filter, wherein ones of the second plurality of coefficients are determined based on a response of the analog transmitter circuitry, wherein the filter is configured to, when operating in the second mode, cause a precursor in the analog signal to be attenuated without attenuating a main lobe or post cursor of the analog signal, wherein the filter is configured to generate and provide the digital value to the DAC.

17. The system as recited in claim 16, wherein the filter includes:
N delay elements, wherein N is an integer value;
K multipliers, wherein K is an integer values, and wherein a first one of the K multipliers is coupled an input to a first one of the N delay elements, and wherein the remaining ones of the K multipliers are coupled to outputs of corresponding ones of the N delay elements; and
K multiplexers coupled to provide coefficients to the K multipliers, wherein ones of the K multiplexers are coupled to receive one of the first plurality of coefficients on a respective first input and one of the second plurality of coefficients on a respective second input.

18. The system as recited in claim 17, further comprising a control circuit configured to cause respective ones of the first plurality of coefficients to be provided to the K multipliers when the filter is receiving a communications packets from the data source, and further configured to cause respective ones of the second plurality of coefficients to be provided to the K multipliers when the filter is receiving a sensing packet.

19. The system as recited in claim 17, wherein the filter further includes a summing circuit configured to compute a sum of values output from the K multipliers.

20. The system as recited in claim 16, wherein the sensing packets are time of flight (ToF) packets used to determine an amount of time a wireless signal is in flight between a transmitter and a receiver.

* * * * *